(12) United States Patent
Kurihara et al.

(10) Patent No.: US 12,018,663 B2
(45) Date of Patent: *Jun. 25, 2024

(54) CAPACITY CONTROL VALVE

(71) Applicant: EAGLE INDUSTRY CO., LTD., Tokyo (JP)

(72) Inventors: Daichi Kurihara, Tokyo (JP); Akihiro Hashiguchi, Tokyo (JP); Kohei Fukudome, Tokyo (JP); Keigo Shirafuji, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 5 days.

This patent is subject to a terminal disclaimer.

(21) Appl. No.: 17/920,008

(22) PCT Filed: Apr. 15, 2021

(86) PCT No.: PCT/JP2021/015598
§ 371 (c)(1),
(2) Date: Oct. 19, 2022

(87) PCT Pub. No.: WO2021/215345
PCT Pub. Date: Oct. 28, 2021

(65) Prior Publication Data
US 2023/0167814 A1    Jun. 1, 2023

(30) Foreign Application Priority Data
Apr. 23, 2020    (JP) .................................. 2020-076940

(51) Int. Cl.
*F04B 27/18*    (2006.01)
*F16K 11/22*    (2006.01)
(Continued)

(52) U.S. Cl.
CPC .............. *F04B 27/18* (2013.01); *F16K 11/22* (2013.01); *F16K 11/24* (2013.01); *F16K 15/184* (2021.08);
(Continued)

(58) Field of Classification Search
CPC .................................................. F04B 27/1804
See application file for complete search history.

(56) References Cited

U.S. PATENT DOCUMENTS 2,617,621 A    11/1952  James ..................... F16K 41/10
3,787,023 A    1/1974   Shufflebarger .......... F16K 41/10
(Continued)

FOREIGN PATENT DOCUMENTS

EP    1081378    3/2001    .............. F04B 27/18
EP    2594794    5/2013    .............. F04B 27/18
(Continued)

OTHER PUBLICATIONS

Chinese Official Action issued in related application serial No. 201980046750.3, dated Mar. 1, 2023, with translation, 12 pages.
(Continued)

*Primary Examiner* — Robert K Arundale
(74) *Attorney, Agent, or Firm* — HAYES SOLOWAY P.C.

(57)    ABSTRACT

A capacity control valve includes a valve housing; a main valve including a valve body driven by a solenoid, and a main valve seat between a discharge port and a control port and with which the valve body is contactable; and a pressure sensitive valve member disposed in a pressure sensitive chamber and forming a pressure sensitive valve, together with a pressure sensitive body. The control port and a suction port communicate with each other through an intermediate communication passage by opening the pressure sensitive valve. The pressure sensitive valve member has a throughhole communicating with the intermediate communication
(Continued)

passage and has a slide valve body attached thereto such that the slide valve body slides relative to the pressure sensitive valve member to open and close the through-hole. A biasing device is provided on a radially outer side of the slide valve body.

20 Claims, 5 Drawing Sheets

(51) Int. Cl.
  *F16K 11/24* (2006.01)
  *F16K 15/18* (2006.01)
(52) U.S. Cl.
  CPC ............ *F04B 27/1804* (2013.01); *F04B 2027/1827* (2013.01); *F04B 2027/1831* (2013.01)

(56) References Cited

U.S. PATENT DOCUMENTS

| | | | |
|---|---|---|---|
| 4,166,607 A | 9/1979 | Webb | F16K 1/10 |
| 4,687,419 A | 8/1987 | Suzuki | F04B 27/1804 |
| 6,010,312 A | 1/2000 | Suitou et al. | F04B 1/26 |
| 6,062,823 A | 5/2000 | Kawaguchi | F04B 27/1804 |
| 6,354,811 B1 | 3/2002 | Ota et al. | 417/222.2 |
| 6,358,017 B1 | 3/2002 | Ota et al. | 417/222.2 |
| 6,361,283 B1 | 3/2002 | Ota et al. | 417/222.2 |
| 6,485,267 B1 | 11/2002 | Imai et al. | F04B 1/26 |
| 6,772,990 B2 | 8/2004 | Sasaki | F16K 31/0627 |
| 7,806,666 B2 | 10/2010 | Umemura | F04B 27/1804 |
| 8,021,124 B2 | 9/2011 | Umemura et al. | 417/222.2 |
| 8,079,827 B2 | 12/2011 | Iwa et al. | 417/222.2 |
| 8,757,988 B2 | 6/2014 | Fukudome | F04B 27/1804 |
| 9,132,714 B2 | 9/2015 | Futakuchi | B60H 1/00485 |
| 9,523,987 B2 | 12/2016 | Fukudome | G05D 7/0106 |
| 9,568,108 B2 | 2/2017 | Takahashi | F16J 15/3496 |
| 9,732,874 B2 | 8/2017 | Saeki | F04B 27/1804 |
| 9,777,863 B2 | 10/2017 | Higashidozono | F04B 27/1804 |
| 9,964,102 B2 | 5/2018 | Kondo | F04B 27/1045 |
| 10,697,548 B2 | 6/2020 | Iguchi | F16J 15/34 |
| 10,781,804 B2 | 9/2020 | Higashidozono et al. | F04B 27/18 |
| 10,883,606 B2 | 1/2021 | Takigahria | F16J 15/3452 |
| 11,053,933 B2 | 7/2021 | Warren | F04B 27/1804 |
| 11,085,431 B2 | 8/2021 | Fukudome | F04B 27/1804 |
| 11,156,301 B2 | 11/2021 | Hayama | F16K 31/0627 |
| 11,225,962 B2 | 1/2022 | Kurihara | G05D 7/0635 |
| 11,319,940 B2 | 5/2022 | Hayama | F16K 11/0627 |
| 11,326,585 B2 | 5/2022 | Hayama et al. | F04B 27/1009 |
| 11,359,624 B2 | 6/2022 | Kurihara et al. | F04B 49/12 |
| 11,454,227 B2 | 9/2022 | Hayama | F04B 27/18 |
| 11,473,684 B2 | 10/2022 | Hayama | G04B 27/1804 |
| 11,480,166 B2 | 10/2022 | Hayama | F16K 31/0603 |
| 11,519,399 B2 | 12/2022 | Kurihara | F04B 49/22 |
| 11,536,257 B2 | 12/2022 | Hayama | F04B 27/10 |
| 11,542,931 B2 | 1/2023 | Hayama | F04B 49/22 |
| 11,555,489 B2 | 1/2023 | Hayama | F04B 27/10 |
| 2004/0060604 A1 | 4/2004 | Uemura et al. | 137/595 |
| 2005/0035321 A1 | 2/2005 | Uemura | F16K 27/041 |
| 2005/0287014 A1 | 12/2005 | Umemura | F04B 27/1804 |
| 2006/0218953 A1 | 10/2006 | Hirota | 62/228.5 |
| 2007/0214814 A1 | 9/2007 | Umemura et al. | 62/228.1 |
| 2008/0138213 A1 | 6/2008 | Umemura | F04B 27/1804 |
| 2009/0108221 A1 | 4/2009 | Umemura | F04B 27/1804 |
| 2009/0183786 A1 | 7/2009 | Iwa et al. | 137/487.5 |
| 2012/0198992 A1 | 8/2012 | Futakuchi et al. | 91/505 |
| 2012/0198993 A1 | 8/2012 | Fukudome et al. | F04B 27/18 |
| 2013/0126017 A1 | 5/2013 | Ota et al. | F04B 27/1804 |
| 2014/0130916 A1 | 5/2014 | Saeki | F04B 27/1804 |
| 2015/0004010 A1 | 1/2015 | Saeki | F04B 27/1804 |
| 2015/0010410 A1 | 1/2015 | Saeki et al. | F04B 49/225 |
| 2015/0068628 A1 | 3/2015 | Iwa et al. | F16K 31/06 |
| 2015/0211506 A1 | 7/2015 | Shirafuji et al. | F04B 27/1804 |
| 2015/0345655 A1 | 12/2015 | Higashidozono et al. | F16K 31/0624 |
| 2016/0290326 A1 | 10/2016 | Sugamura | F04B 27/1804 |
| 2017/0175726 A1 | 6/2017 | Kume | F04B 27/1804 |
| 2017/0028462 A1 | 10/2017 | Hayama et al. | F16K 47/06 |
| 2017/0284562 A1 | 10/2017 | Hayama et al. | F16K 47/06 |
| 2017/0356430 A1 | 12/2017 | Irie et al. | F04B 27/1804 |
| 2017/0363074 A1 | 12/2017 | Taguchi | F04B 27/1081 |
| 2018/0291888 A1 | 10/2018 | Tonegawa | F16K 31/0624 |
| 2020/0191139 A1* | 6/2020 | Warren | F04B 27/18 |
| 2020/0362974 A1 | 11/2020 | Hayama | F04B 49/22 |
| 2021/0285433 A1 | 9/2021 | Hayama | F04B 27/1804 |
| 2022/0034414 A1 | 2/2022 | Ito | F04B 27/18 |
| 2023/0167814 A1* | 6/2023 | Kurihara | F16K 11/24 137/494 |
| 2023/0194007 A1* | 6/2023 | Kurihara | F16K 11/0716 137/597 |

FOREIGN PATENT DOCUMENTS

| | | | |
|---|---|---|---|
| EP | 2784320 | 10/2014 | F04B 27/18 |
| EP | 3431760 | 1/2019 | F04B 27/18 |
| JP | 5-306679 | 11/1993 | F04B 27/08 |
| JP | 6-200875 | 7/1994 | F04B 27/08 |
| JP | 7-27049 | 1/1995 | F04B 27/10 |
| JP | 9-144929 | 6/1997 | F16K 31/06 |
| JP | 10-148258 | 6/1998 | F16J 3/04 |
| JP | 2000-345961 | 12/2000 | F04B 27/14 |
| JP | 2001-73939 | 3/2001 | F04B 27/14 |
| JP | 2001-132632 | 5/2001 | F04B 27/14 |
| JP | 2003-42062 | 2/2003 | F04B 27/14 |
| JP | 2006-52648 | 2/2006 | F04B 27/14 |
| JP | 2006-307828 | 11/2006 | F04B 27/14 |
| JP | 2007-247512 | 9/2007 | F04B 27/14 |
| JP | 2008-14269 | 1/2008 | F04B 27/14 |
| JP | 2008-202572 | 9/2008 | F04B 27/14 |
| JP | 4242624 | 1/2009 | F04B 49/00 |
| JP | 2011-32916 | 2/2011 | F04B 27/14 |
| JP | 4700048 | 3/2011 | F04B 49/00 |
| JP | 5167121 | 12/2012 | F04B 27/14 |
| JP | 2014-118939 | 6/2014 | F04B 27/14 |
| JP | 5557901 | 6/2014 | F04B 27/14 |
| JP | 2014-190247 | 10/2014 | F04B 27/14 |
| JP | 2016-196876 | 11/2016 | F04B 27/18 |
| JP | 2017-129042 | 7/2017 | F04B 27/18 |
| JP | 6206274 | 10/2017 | F04B 27/18 |
| JP | 2017-223348 | 12/2017 | F16K 11/10 |
| JP | 2018-21646 | 2/2018 | F16K 31/06 |
| JP | 2018-40385 | 3/2018 | F16K 31/06 |
| JP | 2018-145877 | 9/2018 | F04B 39/14 |
| JP | 2019-2384 | 1/2019 | F04B 27/18 |
| WO | WO2007119380 | 10/2007 | F04B 27/14 |
| WO | WO2011021789 | 2/2011 | F04B 27/14 |
| WO | WO2011065693 | 6/2011 | F04B 27/14 |
| WO | WO2011135911 | 11/2011 | F04B 27/14 |
| WO | WO2013109005 | 7/2013 | F04B 49/06 |
| WO | WO2013176012 | 11/2013 | F04B 27/14 |
| WO | WO2014091975 | 6/2014 | F04B 27/14 |
| WO | WO2014119594 | 8/2014 | F04B 27/14 |
| WO | WO2016104390 | 6/2016 | F16K 31/06 |
| WO | WO2017057160 | 4/2017 | F04B 27/18 |
| WO | WO2017159553 | 9/2017 | F04B 27/18 |
| WO | WO2018207461 | 11/2018 | F04B 27/18 |
| WO | WO2019146674 | 8/2019 | |
| WO | WO2019167912 | 9/2019 | F04B 27/18 |

OTHER PUBLICATIONS

Chinese Official Action issued in related application serial No. 202080026386.7, dated Oct. 31, 2022, with translation, 8 pages.
European Official Action issued in related application serial No. 19847690.5, dated Jul. 10, 2023, 4 pages.
Korean Official Action issued in related application serial No. 10-2021-7019897, dated Oct. 21, 2023, 10 pages.
U.S. Official Action issued in related U.S. Appl. No. 17/256,955, dated Aug. 23, 2022, 17 pages.

(56) References Cited

OTHER PUBLICATIONS

U.S. Official Action issued in related U.S. Appl. No. 17/599,539, dated Apr. 25, 2023, 6 pages.
U.S. Official Action issued in related U.S. Appl. No. 17/417,701, dated Aug. 2, 2023, 11 pages.
U.S. Official Action issued in related U.S. Appl. No. 17/417,701, dated Nov. 9, 2023, 14 pages.
U.S. Official Action issued in related U.S. Appl. No. 17/258,692, dated Aug. 3, 2023, 8 pages.
U.S. Official Action issued in related U.S. Appl. No. 17/600,547, dated Sep. 13, 2023, 13 pages.
U.S. Official Action issued in related U.S. Appl. No. 17/258,708, dated Sep. 25, 2023, 5 pages.
U.S. Official Action issued in related U.S. Appl. No. 17/256,947, dated Nov. 20, 2023, 10 pages.
Notice of Allowance issued in related U.S. Appl. No. 17/599,539, dated Jul. 25, 2023, 4 pages.
Notice of Allowance issued in related U.S. Appl. No. 17/258,692, dated Sep. 27, 2023, 5 pages.
Notice of Allowance issued in related U.S. Appl. No. 17/258,708, dated Dec. 21, 2023, 6 pages.
Notice of Allowance issued in related U.S. Appl. No. 17/600,547, dated Nov. 28, 2023, 6 pages.
U.S. Appl. No. 17/259,138, filed Jan. 8, 2021, Hayama et al.
U.S. Appl. No. 17/258,708, filed Jan. 7, 2021, Hayama et al.
U.S. Appl. No. 17/256,947, filed Dec. 29, 2020, Hayama et al.
U.S. Appl. No. 17/256,955, filed Dec. 29, 2020, Hayama et al.
U.S. Appl. No. 17/256,959, filed Dec. 29, 2020, Hayama et al.
U.S. Appl. No. 17/256,953, filed Dec. 29, 2020, Hayama et al.
U.S. Appl. No. 17/056,988, filed Nov. 19, 2020, Kurihara et al.
U.S. Appl. No. 16/969,175, filed Aug. 11, 2020, Kurihara et al.
U.S. Appl. No. 16/967,693, filed Aug. 5, 2020, Hayama et al.
U.S. Appl. No. 16/967,692, filed Aug. 5, 2020, Hayama et al.
U.S. Appl. No. 16/962,786, filed Jul. 16, 2020, Hayama et al.
Official Action issued in related application serial No. 10-2021-7035024, dated Jan. 2, 2024, 12 pages with translation.
International Search Report and Written Opinion issued in PCT/JP2019/002207, dated Apr. 23, 2019, with English translation, 13 pages.
International Preliminary Report on Patentability issued in PCT/JP2019/002207, dated Jul. 28, 2020, 7 pages.
International Search Report and Written Opinion issued in PCT/JP2019/005200, dated Apr. 23, 2019, with English translation, 12 pages.
International Preliminary Report on Patentability issued in PCT/JP2019/005200, dated Aug. 18, 2020, 7 pages.
International Search Report and Written Opinion issued in PCT/JP2019/007187, dated Apr. 23, 2019, with English translation, 16 pages.
International Preliminary Report on Patentability issued in PCT/JP2019/007187, dated Sep. 3, 2020, 8 pages.
International Search Report and Written Opinion issued in PCT/JP2019/020196, dated Aug. 27, 2019, with English translation, 11 pages.
International Preliminary Report on Patentability issued in PCT/JP2019/020196, dated Nov. 24, 2020, with English translation, 6 pages.
International Search Report and Written Opinion issued in PCT/JP2019/005199, dated Apr. 23, 2019, with English translation, 12 pages.
International Preliminary Report on Patentability issued in PCT/JP2019/005199, dated Aug. 18, 2020, 4 pages.
International Search Report and Written Opinion issued in PCT/JP2019/027112, dated Oct. 15, 2019, with English translation, 10 pages.
International Preliminary Report on Patentability issued in PCT/JP2019/027112, dated Jan. 19, 2021, 4 pages.
International Search Report and Written Opinion issued in PCT/JP2019/027071, dated Oct. 15, 2019, with English translation, 12 pages.
International Preliminary Report on Patentability issued in PCT/JP2019/027071, dated Jan. 12, 2021, 4 pages.
International Search Report and Written Opinion issued in PCT/JP2019/027072, dated Oct. 8, 2019, with English translation, 10 pages.
International Preliminary Report on Patentability issued in PCT/JP2019/027072, dated Jan. 12, 2021, 4 pages.
International Search Report and Written Opinion issued in PCT/JP2019/027073, dated Oct. 15, 2019, with English translation, 10 pages.
International Preliminary Report on Patentability issued in PCT/JP2019/027073, dated Jan. 12, 2021, 4 pages.
International Search Report and Written Opinion issued in PCT/JP2019/031067, dated Oct. 15, 2019, with English translation, 18 pages.
International Preliminary Report on Patentability issued in PCT/JP2019/031067, dated Feb. 9, 2021, 6 pages.
International Search Report and Written Opinion issued in PCT/JP2019/031068, dated Oct. 15, 2019, with English translation, 13 pages.
International Preliminary Report on Patentability issued in PCT/JP2019/031068, dated Feb. 9, 2021, 5 pages.
International Search Report and Written Opinion issued in PCT/JP2019/031069, dated Oct. 15, 2019, with English translation, 12 pages.
International Preliminary Report on Patentability issued in PCT/JP2019/031069, dated Feb. 9, 2021, 4 pages.
International Search Report and Written Opinion issued in PCT/JP2019/043374, dated Jan. 7, 2020, with English translation, 10 pages.
International Preliminary Report on Patentability issued in PCT/JP2019/043374, dated May 11, 2021, 4 pages.
International Search Report and Written Opinion issued in PCT/JP2019/047192, dated Jun. 11, 2020, with English translation, 15 pages.
International Preliminary Report on Patentability issued in PCT/JP2019/047192, dated Jun. 8, 2021, 4 pages.
International Search Report and Written Opinion issued in PCT/JP2020/001443, dated Mar. 31, 2020, with English translation, 15 pages.
International Preliminary Report on Patentability issued in PCT/JP2020/001443, dated Jul. 29, 2021, 8 pages.
International Search Report and Written Opinion issued in PCT/JP2020/007953, dated Apr. 7, 2020, with English translation, 17 pages.
International Preliminary Report on Patentability issued in PCT/JP2020/007953, dated Sep. 16, 2021, 10 pages.
International Search Report and Written Opinion issued in PCT/JP2020/015181, dated Jun. 16, 2020, with English translation, 11 pages.
International Preliminary Report on Patentability issued in PCT/JP2020/015181, dated Oct. 14, 2021, 5 pages.
International Search Report and Written Opinion issued in PCT/JP2020/015175, dated Jun. 23, 2020, with English translation, 13 pages.
International Preliminary Report on Patentability issued in PCT/JP2020/015175, dated Oct. 14, 2021, 6 pages.
International Search Report and Written Opinion issued in PCT/JP2021/015598, dated Jun. 15, 2021, with English translation, 13 pages.
International Preliminary Report on Patentability issued in PCT/JP2020/015598, dated Oct. 25, 2022, 5 pages.
Chinese Official Action issued in related application serial No. 201980044409.4, dated Jan. 26, 2022, with translation, 10 pages.
Chinese Official Action issued in related application serial No. 201980044138.2, dated Mar. 30, 2022, with translation, 9 pages.
Chinese Official Action issued in related application serial No. 201980044077.x, dated Apr. 2, 2022, with translation, 11 pages.
Chinese Official Action issued in related application serial No. 201980046798.4, dated Apr. 6, 2022, with translation, 8 pages.
Chinese Official Action issued in related application serial No. 201980046750.3, dated Apr. 27, 2022, with translation, 10 pages.

(56) References Cited

OTHER PUBLICATIONS

Chinese Official Action issued in related application serial No. 201980047614.6, dated Apr. 26, 2022, with translation, 9 pages.
Chinese Official Action issued in related application serial No. 202080016397.7, dated Aug. 3, 2022, with translation, 10 pages.
Chinese Official Action issued in related application serial No. 202080007416.X, dated Jul. 28, 2022, with translation, 9 pages.
Chinese Official Action issued in related application serial No. 202080026878.6, dated Oct. 9, 2022, with translation, 9 pages.
Chinese Official Action issued in related application serial No. 201980046750.3, dated Nov. 3, 2022, with translation, 11 pages.
European Search Report issued in related application serial No. 19848099.8, dated Feb. 9, 2022, 7 pages.
European Search Report issued in related application serial No. 19834984.7, dated Feb. 21, 2022, 12 pages.
European Search Report issued in related application serial No. 19833331.2, dated Mar. 30, 2022, 6 pages.
European Search Report issued in related application serial No. 19847690.5, dated Feb. 9, 2022, 5 pages.
European Search Report issued in related application serial No. 19847395.1, dated Feb. 9, 2022, 5 pages.
European Search Report issued in related application serial No. 19834556.3, dated Feb. 17, 2022, 7 pages.
European Search Report issued in related application serial No. 19833028.4, dated Apr. 7, 2022, 8 pages.
European Search Report issued in related application serial No. 19894059.5, dated Jun. 7, 2022, 4 pages.
European Official Action issued in related application serial No. 19883193.5, dated May 23, 2022, 5 pages.
European Official Action issued in related application serial No. 20782597.7, dated Oct. 19, 2022, 5 pages.
European Official Action issued in related application serial No. 20744724.4, dated Sep. 16, 2022, 8 pages.
European Official Action issued in related application serial No. 20765478.1, dated Nov. 3, 2022, 7 pages.
European Official Action issued in related application serial No. 20783639.6, dated Nov. 22, 2022, 8 pages.
U.S. Official Action issued in related U.S. Appl. No. 17/299,285, dated Mar. 31, 2022, 11 pages.
U.S. Official Action issued in related U.S. Appl. No. 17/256,953, dated Apr. 15, 2022, 18 pages.
U.S. Official Action issued in related U.S. Appl. No. 17/259,138, dated Mar. 31, 2022, 5 pages.
U.S. Official Action issued in related U.S. Appl. No. 17/256,955, dated Feb. 18, 2022, 19 pages.
U.S. Official Action issued in related U.S. Appl. No. 17/259,138, dated Jan. 19, 2022, 6 pages.
U.S. Official Action issued in related U.S. Appl. No. 17/256,959, dated May 5, 2022, 18 pages.
U.S. Official Action issued in related U.S. Appl. No. 17/433,558, dated May 25, 2022, 11 pages.
Notice of Allowance issued in related U.S. Appl. No. 17/287,086, dated Feb. 2, 2022, 7 pages.
U.S. Notice of Allowance issued in related U.S. Appl. No. 17/256,959, dated Sep. 7, 2022, 13 pages.
www.lexico.com/en/definition/connected accessed Aug. 15, 2022, Year 2022.

* cited by examiner

CAPACITY CONTROL VALVE

The present invention relates to a capacity control valve that variably controls capacity of a working fluid, for example, to a capacity control valve that controls a discharge amount of a variable displacement compressor used for an air conditioning system of an automobile according to pressure.

BACKGROUND ART

A variable displacement compressor used for an air conditioning system of an automobile, etc. includes a rotating shaft to be driven and rotated by an engine, a swash plate coupled to the rotating shaft in such a manner that a tilt angle is variable, compressing pistons coupled to the swash plate, etc., and by changing the tilt angle of the swash plate, changes a stroke amount of the pistons to control a discharge amount of fluid. This tilt angle of the swash plate can be continuously changed by appropriately controlling pressure in a control chamber while utilizing a suction pressure Ps of a suction chamber that suctions the fluid, a discharge pressure Pd of a discharge chamber that discharges the fluid pressurized by the pistons, and a control pressure Pc of the control chamber that houses the swash plate, by means of a capacity control valve to be driven to open and close by electromagnetic force.

At the time of continuously driving the variable displacement compressor, the capacity control valve performs normal control in which energization is controlled by a control computer, a valve body is moved in an axial direction by electromagnetic force generated in a solenoid, and a main valve provided between a discharge port through which a discharge fluid of the discharge pressure Pd passes and a control port through which a control fluid of the control pressure Pc passes is opened and closed to adjust the control pressure Pc of the control chamber of the variable displacement compressor.

During normal control of the capacity control valve, the pressure of the control chamber in the variable displacement compressor is appropriately controlled, and the tilt angle of the swash plate with respect to the rotating shaft is continuously changed to change the stroke amount of the pistons and to control the amount of discharge of the fluid to the discharge chamber, so that the air conditioning system is adjusted to have a target cooling capacity. In addition, when the variable displacement compressor is driven at the maximum capacity, the main valve of the capacity control valve is closed to lower the pressure of the control chamber, so that the tilt angle of the swash plate is maximized.

In addition, a configuration has been known in which an auxiliary communication passage is formed that provides communication between a control port and a suction port of a capacity control valve, and a refrigerant of a control chamber of a variable displacement compressor is discharged to a suction chamber of the variable displacement compressor through the control port, the auxiliary communication passage, and the suction port at a start-up, to rapidly lower the pressure of the control chamber at the start-up, so that the responsiveness of the variable displacement compressor is improved (refer to Patent Citation 1).

CITATION LIST

Patent Literature

Patent Citation 1: JP 5167121 B2 (PAGE 7 and FIG. 2)

SUMMARY OF INVENTION

Technical Problem

However, according to the configuration disclosed in Patent Citation 1, a fluid discharge function at a start-up is good, but at the time of continuously driving the variable displacement compressor, the auxiliary communication passage allows communication, and the refrigerant flows from the control port into the suction port, so that the refrigerant circulation amount increases and the operating efficiency of the variable displacement compressor decreases, which is a problem.

The present invention is conceived in view of such a problem, and an object of the present invention is to provide a capacity control valve having a fluid discharge function at a start-up and having good operating efficiency.

Solution to Problem

In order to solve the foregoing problem, according to the present invention, there is provided a capacity control valve including: a valve housing provided with a discharge port through which a discharge fluid of a discharge pressure passes, a suction port through which a suction fluid of a suction pressure passes, and a control port through which a control fluid of a control pressure passes; a main valve including a valve body driven by a solenoid, and a main valve seat which is provided between the discharge port and the control port and with which the valve body is contactable; a pressure sensitive body disposed in a pressure sensitive chamber; and a pressure sensitive valve member extending from the valve body to the pressure sensitive chamber and forming a pressure sensitive valve, together with the pressure sensitive body. An intermediate communication passage is formed in the valve body and in the pressure sensitive valve member, and the control port and the suction port are allowed to communicate with each other through the intermediate communication passage by opening the pressure sensitive valve. The pressure sensitive valve member is provided with a through-hole communicating with the intermediate communication passage and has a slide valve body attached thereto such that the slide valve body slides relative to the pressure sensitive valve member to open and close the through-hole. A biasing device that biases the slide valve body in an opening direction is provided on a radially outer side of the slide valve body. According to the aforesaid feature of the present invention, when the main valve is closed at a start-up and in a maximum energized state, the slide valve body is reliably slid by a biasing force of the biasing device to open the through-hole and to provide communication between the control port and the suction port, so that the control pressure can be quickly lowered. On the other hand, when the main valve is controlled in an energized state, the slide valve body is slid by a fluid flowing due to opening of the main valve, to close the through-hole and to shut off communication between the control port and the suction port, so that the fluid can be prevented from flowing into the suction port from the control port. In such a manner, the discharge of a liquid refrigerant and the operating efficiency at a start-up of the variable displacement compressor can be improved.

It may be preferable that the biasing device is disposed between the slide valve body and a support portion formed closer to a tip side than the through-hole in pressure sensitive valve member. According to this preferable configuration, the biasing device and the through-hole of the pressure sensitive valve member can be disposed at a position to overlap each other in a radial direction, so that the axial length of each of the slide valve body and the pressure sensitive valve member can be shortened, and the capacity control valve can be compactly configured.

It may be preferable that the biasing device is disposed so as to be exposed to the pressure sensitive chamber. According to this preferable configuration, it is difficult for the biasing device to be affected by the pressure of the fluid which is involved in opening and closing of the through-hole by the slide valve body, so that the responsiveness of the biasing device is good.

It may be preferable that an inner peripheral surface of the slide valve body is formed as a flush surface. According to this preferable configuration, the slidability of the slide valve body on the pressure sensitive valve member can be enhanced, and the amount of the fluid leaking to the intermediate communication passage through a very small gap between an inner peripheral surface of the slide valve body and an outer peripheral surface of the pressure sensitive valve member can be reduced, so that the operating efficiency of the variable displacement compressor can be further improved.

It may be preferable that a receiving surface facing toward the main valve side is formed in the slide valve body. According to this preferable configuration, the slide valve body is easily actuated by the fluid flowing due to opening of the main valve.

It may be preferable that the receiving surface is tilted with respect to a reciprocating direction of the valve body. According to this preferable configuration, the fluid easily flows from the discharge port to the control port due to opening of the main valve.

It may be preferable that the slide valve body is disposed to be strokable in a closed state of the through-hole. According this preferable configuration, since the through-hole is in a closed state until the slide valve body slides by a predetermined distance or more, the closed state of the through-hole can be maintained even when the slide valve body slightly slides due to disturbance such as vibration. As described above, the capacity control valve is resistant to disturbance, and has good control accuracy.

It may be preferable that the valve body and the pressure sensitive valve member are separate bodies, and a stopper portion that restricts a movement of the slide valve body toward the main valve is formed in the valve body. According to this preferable configuration, the sliding of the slide valve body can be restricted with a simple structure.

It may be preferable that a plurality of the through-holes are formed in the pressure sensitive valve member. According to this preferable configuration, a wide cross-sectional area of a flow passage can be secured.

DESCRIPTION OF EMBODIMENTS

Modes for carrying out a capacity control valve according to the present invention will be described below based on an embodiment.

Embodiment

Figure 1:
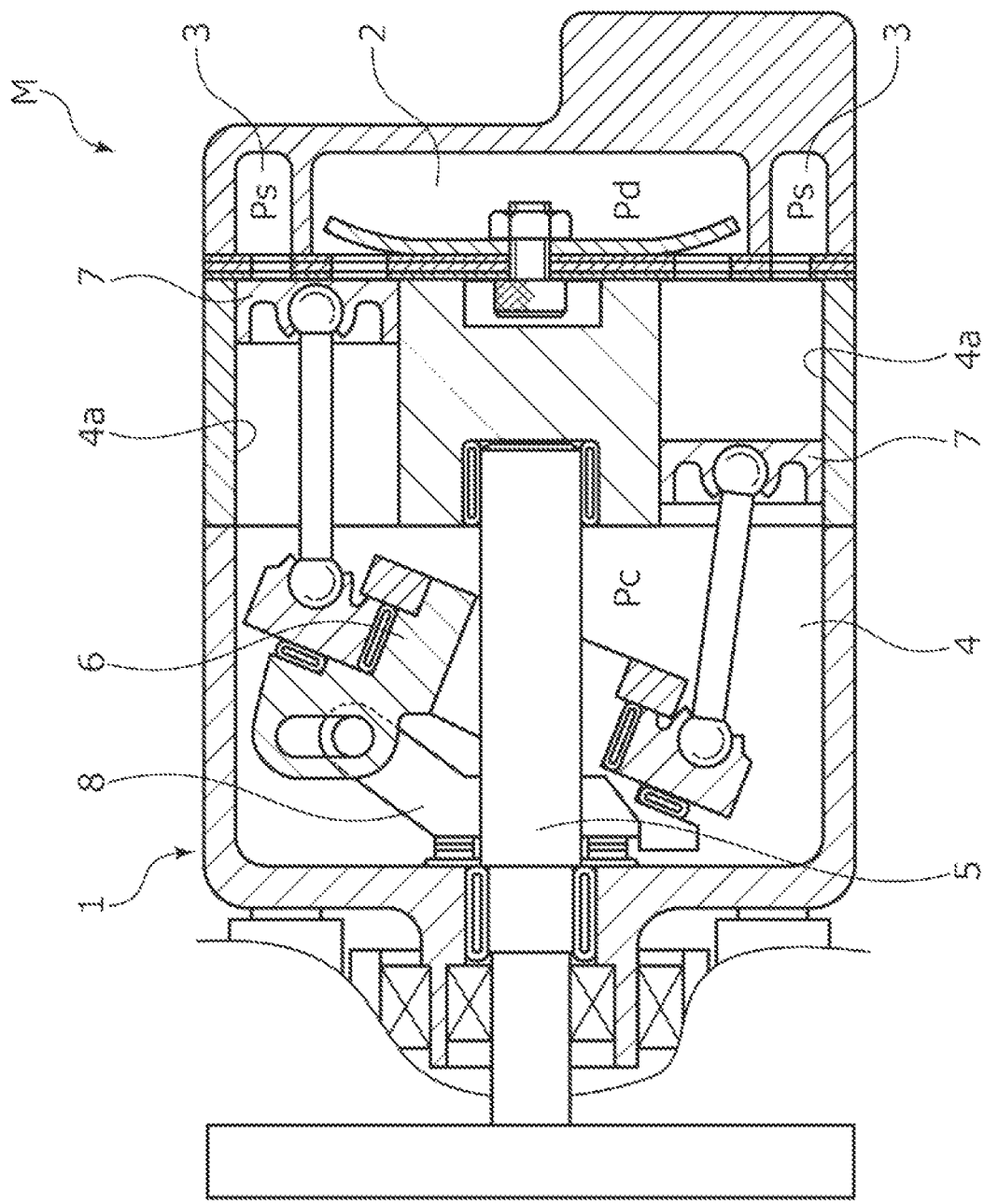
FIG. 1 is a schematic configuration view showing a swash plate-type variable displacement compressor into which a capacity control valve according to an embodiment of the present invention is assembled.
Figure 2:
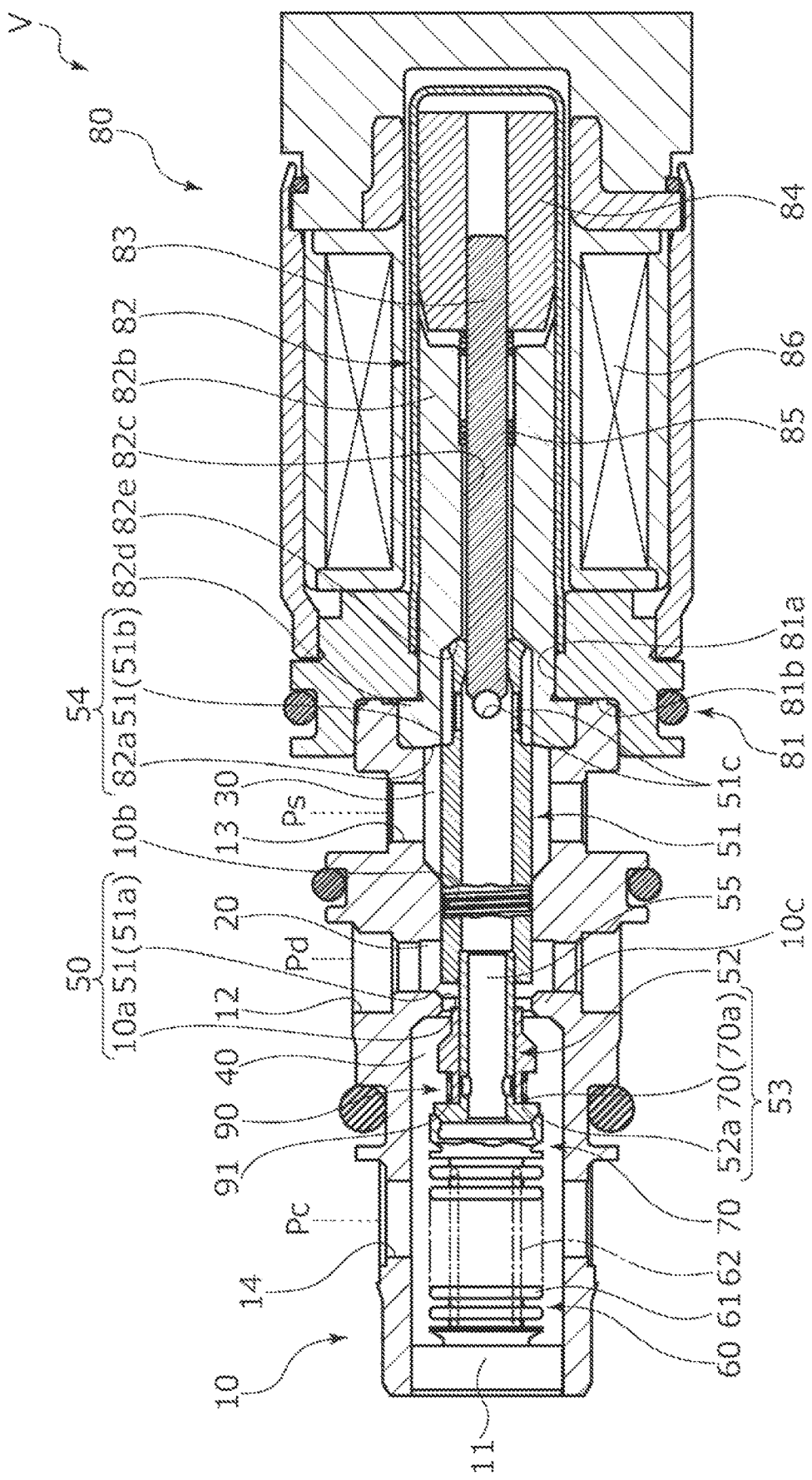
FIG. 2 is a cross-sectional view showing a state where a main valve is opened and a through-hole of a pressure sensitive valve member is closed by a slide valve body in a non-energized state of the capacity control valve of the embodiment.

A capacity control valve according to an embodiment of the present invention will be described with reference to FIGS. 1 to 4. Hereinafter, a description will be given based on the assumption that the left and right sides when seen from the front side of FIG. 2 are left and right sides of the capacity control valve. In detail, a description will be given based on the assumption that the left side of the drawing sheet on which a pressure sensitive body 60 is disposed is the left side of the capacity control valve and the right side of the drawing sheet on which a solenoid 80 is disposed is the right side of the capacity control valve.

A capacity control valve V of the present invention is assembled into a variable displacement compressor M used for an air conditioning system of an automobile, etc., and by variably controlling the pressure of a working fluid (hereinafter, simply referred to as a "fluid") that is a refrigerant, controls the discharge amount of the variable displacement compressor M to adjust the air conditioning system to have a target cooling capacity.

First, the variable displacement compressor M will be described. As shown in FIG. 1, the variable displacement compressor M includes a casing 1 including a discharge chamber 2, a suction chamber 3, a control chamber 4, and a plurality of cylinders 4a. Incidentally, the variable displacement compressor M is provided with a communication passage (not shown) that provides direct communication between the control chamber 4 and the suction chamber 3, and the communication passage is provided with a fixed orifice that adjusts and balances pressure between the suction chamber 3 and the control chamber 4.

In addition, the variable displacement compressor M includes a rotating shaft 5 to be driven and rotated by an engine (not shown) installed outside the casing 1; a swash plate 6 coupled to the rotating shaft 5 so as to be tiltable by a hinge mechanism 8 in the control chamber 4; and a plurality of pistons 7 that are coupled to the swash plate 6 and that are reciprocatably fitted in the respective cylinders 4a, and appropriately controls pressure in the control chamber 4 while utilizing a suction pressure Ps of the suction chamber 3 that suctions the fluid, a discharge pressure Pd of the discharge chamber 2 that discharges the fluid pressurized by the pistons 7, and a control pressure Pc of the control chamber 4 that houses the swash plate 6, by means of a capacity control valve V to be driven to open and close by electromagnetic force, to continuously change the tilt angle of the swash plate 6, and thus to change the stroke amount of the pistons 7 and to control the discharge amount of the fluid. Incidentally, for convenience of description, the capacity control valve V assembled into the variable displacement compressor M is not shown in FIG. 1.

Specifically, the higher the control pressure Pc in the control chamber 4 is, the smaller the tilt angle of the swash plate 6 with respect to the rotating shaft 5 is to reduce the stroke amount of the pistons 7, and when the control pressure Pc reaches a certain pressure or higher, the swash plate 6 is substantially perpendicular to the rotating shaft 5, namely, slightly tilted from perpendicularity. At this time, since the stroke amount of the pistons 7 is minimized and the pressurization of the fluid in the cylinders 4*a* by the pistons 7 is minimized, the amount of discharge of the fluid to the discharge chamber 2 is reduced, and the cooling capacity of the air conditioning system is minimized. On the other hand, the lower the control pressure Pc in the control chamber 4 is, the larger the tilt angle of the swash plate 6 with respect to the rotating shaft 5 is to increase the stroke amount of the pistons 7, and when the control pressure Pc reaches a certain pressure or lower, the swash plate 6 has a maximum tilt angle with respect to the rotating shaft 5. At this time, since the stroke amount of the pistons 7 is maximized and the pressurization of the fluid in the cylinders 4*a* by the pistons 7 is maximized, the amount of discharge of the fluid to the discharge chamber 2 is increased, and the cooling capacity of the air conditioning system is maximized.

As shown in FIG. 2, the capacity control valve V assembled into the variable displacement compressor M controls an electric current that energizes a coil 86 forming the solenoid 80, to perform opening and closing control of a main valve 50 and an auxiliary valve 54 in the capacity control valve V, and performs opening and closing control of a pressure sensitive valve 53 using the suction pressure Ps to control the fluid flowing into the control chamber 4 or flowing out from the control chamber 4, thereby variably controlling the control pressure Pc in the control chamber 4.

In the present embodiment, the main valve 50 includes a main and auxiliary valve body 51 serving as a valve body and a main valve seat 10*a* that is formed at an annular protrusion portion 10*c* having an isosceles trapezoidal shape in a cross-sectional view and protruding from an inner peripheral surface of a valve housing 10 to a radially inner side, and an axially left end 51*a* of the main and auxiliary valve body 51 comes into contact with and separates from the main valve seat 10*a* to open and close the main valve 50. The auxiliary valve 54 includes the main and auxiliary valve body 51 and an auxiliary valve seat 82*a* formed in an opening end surface of a fixed iron core 82, namely, in an axially left end surface of the fixed iron core 82, and a step portion 51*b* on an axially right side of the main and auxiliary valve body 51 comes into contact with and separates from the auxiliary valve seat 82*a* to open and close the auxiliary valve 54. The pressure sensitive valve 53 includes an adapter 70 of the pressure sensitive body 60 and a pressure sensitive valve seat 52*a* formed at an axially left end of a pressure sensitive valve member 52, and an axially right end 70*a* of the adapter 70 comes into contact with and separates from the pressure sensitive valve seat 52*a* to open and close the pressure sensitive valve 53.

Next, a structure of the capacity control valve V will be described. As illustrated in FIG. 2, the capacity control valve V mainly includes the valve housing 10 made of a metallic material or a resin material; the main and auxiliary valve body 51 and the pressure sensitive valve member 52 disposed inside the valve housing 10 so as to be reciprocatable in an axial direction; the pressure sensitive body 60 that applies a biasing force to the main and auxiliary valve body 51 and to the pressure sensitive valve member 52 to the right in the axial direction according to the suction pressure Ps; the solenoid 80 connected to the valve housing 10 to exert a driving force on the main and auxiliary valve body 51 and the pressure sensitive valve member 52; and a slide valve body 90 provided to be reciprocatable relative to the pressure sensitive valve member 52 in the axial direction by a flow of the fluid generated by opening of the main valve 50. Since the slide valve body 90 opens and closes a flow passage between an auxiliary valve chamber 30 and a pressure sensitive chamber 40 that have the suction pressure Ps and the control pressure Pc, respectively, when the slide valve body 90 reciprocates, it can be said that the slide valve body 90 forms a CS valve, together with the pressure sensitive valve member 52, the CS valve rapidly releasing the control pressure Pc of the control chamber 4 to the suction chamber 3 through a through-hole 52*d* of the pressure sensitive valve member 52 and through an intermediate communication passage 55 to be described later.

As illustrated in FIG. 2, the solenoid 80 mainly includes a casing 81 including an opening portion 81*a* that is open to the left in the axial direction; the fixed iron core 82 having a substantially cylindrical shape and being inserted into the opening portion 81*a* of the casing 81 from the left in the axial direction to be fixed to an radially inner side of the casing 81; a drive rod 83 which is reciprocatable in the axial direction on the radially inner side of the fixed iron core 82 and of which an axially left end portion is connected and fixed to the main and auxiliary valve body 51; a movable iron core 84 firmly fixed to an axially right end portion of the drive rod 83; a coil spring 85 provided between the fixed iron core 82 and the movable iron core 84 to bias the movable iron core 84 to the right in the axial direction; and a coil 86 for excitation wound on an outer side of the fixed iron core 82 with a bobbin interposed therebetween.

A radially inner side of an axially left end of the casing 81 is recessed to the right in the axial direction to form a recessed portion 81*b*, and an axially right end portion of the valve housing 10 is inserted and fixed to the recessed portion 81*b* in a substantially sealed state.

The fixed iron core 82 is made of a rigid body that is a magnetic material such as iron or silicon steel, and includes a cylindrical portion 82*b* which extends in the axial direction and in which an insertion hole 82*c* into which the drive rod 83 is inserted is formed, and a flange portion 82*d* having an annular shape and extending from an outer peripheral surface of an axially left end portion of the cylindrical portion 82*b* in a radially outward direction, and a radially inner side of an axially left end of the cylindrical portion 82*b* is recessed to the right in the axial direction to form a recessed portion 82*e*.

As illustrate in FIG. 2, a Pd port 12 that is a discharge port communicating with the discharge chamber 2 of the variable displacement compressor M, a Ps port 13 that is a suction port communicating with the suction chamber 3 of the variable displacement compressor M, and a Pc port 14 that is a control port communicating with the control chamber 4 of the variable displacement compressor M are formed in the valve housing 10.

A partition adjustment member 11 is press-fitted into an axially left end portion of the valve housing 10 in a substantially sealed state, so that the valve housing 10 has a substantially bottomed cylindrical shape. Incidentally, the partition adjustment member 11 can adjust the installation position of the valve housing 10 in the axial direction to adjust a biasing force of the pressure sensitive body 60.

A main valve chamber 20 communicates with the Pd port 12 and in which an axially left end 51*a* side of the main and auxiliary valve body 51 is disposed, the auxiliary valve chamber 30 which communicates with the Ps port 13 and in which a back pressure side of the main and auxiliary valve body 51, namely, the step portion 51b on the axially right side of the main and auxiliary valve body 51 is disposed, and the pressure sensitive chamber 40 which communicates with the Pc port 14 and in which the pressure sensitive valve member 52, the slide valve body 90, and the pressure sensitive body 60 are disposed are formed inside the valve housing 10.

In addition, the main and auxiliary valve body 51 and the pressure sensitive valve member 52 inserted and fixed to the main and auxiliary valve body 51 are disposed inside the valve housing 10 so as to be reciprocatable in the axial direction, and a guide hole 10b which has a small diameter and with which an outer peripheral surface of the main and auxiliary valve body 51 is in slidable contact in a substantially sealed state is formed at an axially right, end portion of the inner peripheral surface of the valve housing 10. Further, inside the valve housing 10, the main valve chamber 20 and the auxiliary valve chamber 30 are partitioned off by the outer peripheral surface of the main and auxiliary valve body 51 and an inner peripheral surface of the guide hole 10b. Incidentally, the inner peripheral surface of the guide hole 10b and the outer peripheral surface of the main and auxiliary valve body 51 are slightly separated from each other in a radial direction to form a very small gap therebetween, and the main and auxiliary valve body 51 is smoothly movable relative to the valve housing 10 in the axial direction.

As illustrated in FIG. 2, the pressure sensitive body 60 mainly includes a bellows core 61 in which a coil spring 62 is built-in, and the adapter 70 provided at an axially right end portion of the bellows core 61, and an axially left end of the bellows core 61 is fixed to the partition adjustment member 11.

In addition, the pressure sensitive body 60 is disposed in the pressure sensitive chamber 10, and the axially right end 70a of the adapter 70 is seated on the pressure sensitive valve seat 52a of the pressure sensitive valve member 52 by a biasing force to move the adapter 70 to the right in the axial direction that is applied by the coil spring 62 and the bellows core 61. In addition, a force to the left in the axial direction is applied to the adapter 70 according to the suction pressure Ps in the intermediate communication passage 55.

As illustrated in FIG. 2, the main and auxiliary valve body 51 is formed in a substantially cylindrical shape. The pressure sensitive valve member 52 that is separately formed in a flanged cylindrical shape and in a substantially turret shape in a side view is inserted and fixed to an axially left end portion of the main and auxiliary valve body 51 in a substantially sealed state, and the drive rod 83 is inserted and fixed to an axially right end portion of the main and auxiliary valve body 51 in a substantially sealed state. The main and auxiliary valve body 51, the pressure sensitive valve member 52, and the drive rod 83 are movable together in the axial direction.

In addition, since the labyrinth effect of annular grooves formed in the outer peripheral surface of the main and auxiliary valve body 51 can suppress the leakage of the fluid from the main valve chamber 20 to the auxiliary valve chamber 30, the discharge pressure Pd of the discharge fluid supplied from the discharge chamber 2 to the main valve chamber 20 via the Pd port 12 is maintained.

Incidentally, hollow holes inside the main and auxiliary valve body 51 and inside the pressure sensitive valve member 52 are connected to each other to form the intermediate communication passage 55 penetrating therethrough in the axial direction. Incidentally, the intermediate communication passage 55 communicates with the auxiliary valve chamber 30 via a plurality of through-holes 51c penetrating through the axially right end portion of the main and auxiliary valve body 51 in the radial direction.

Figure 3:
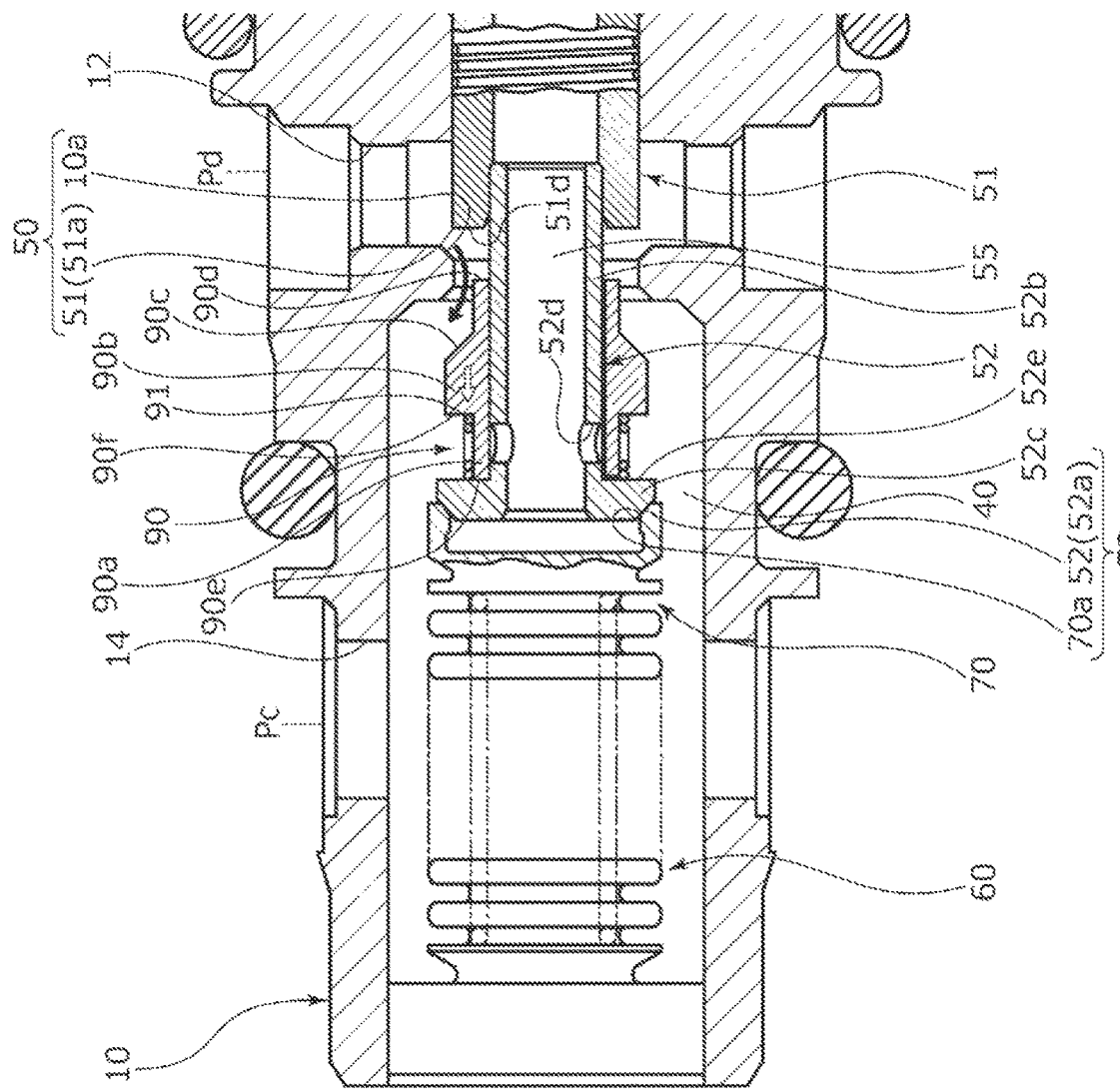
FIG. 3 is an enlarged cross-sectional view of FIG. 2 showing a state where the main valve is opened and the through-hole of the pressure sensitive valve member is closed by the slide valve body in a non-energized state of the capacity control valve of the embodiment.
Figure 4:
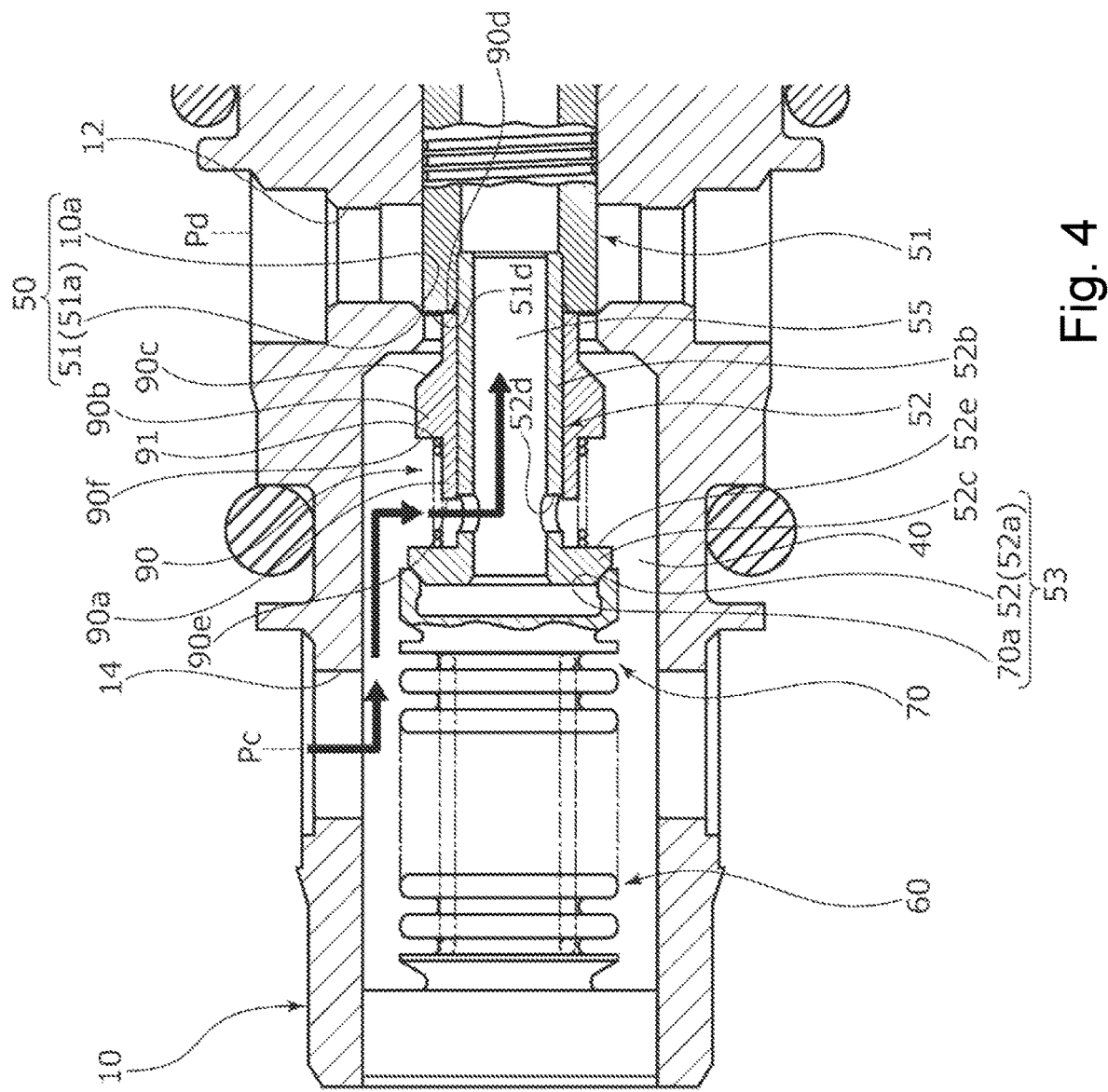
FIG. 4 is an enlarged cross-sectional view showing a state where the main valve is closed and the slide valve body is moved to open the through-hole of the pressure sensitive valve member in an energized state of the capacity control valve of the embodiment.

As shown in FIGS. 2 to 4, the pressure sensitive valve member 52 is formed in a flanged cylindrical shape and in a substantially turret shape in a side view, and includes a base portion 52b having a cylindrical shape of which an axially right end portion is inserted and fixed to the main and auxiliary valve body 51 in a substantially sealed state and to which the slide valve body 90 is externally fitted, and a flange portion 52c that is a support portion which extends from an outer peripheral surface of an axially left end portion of the base portion 52b in the radially outward direction and in which the pressure sensitive valve seat 52a that comes into contact with and separates from the axially right end 70a of the adapter 70 is formed. Incidentally, a plurality of the through-holes 52d penetrating through the base portion 52b in the radial direction and communicating with the intermediate communication passage 55 are formed at the axially left end portion of the base portion. 52b.

As shown in FIGS. 2 to 4, the slide valve body 90 is formed in a flanged cylindrical shape, and includes a base portion 90a having a cylindrical shape and being externally fitted to the base portion 52b of the pressure sensitive valve member 52, and a flange portion 90b extending from an outer peripheral surface of a substantially axially center portion of the base portion 90a in the radially outward direction. The slide valve body 90 is biased toward the right in the axial direction by a coil spring 91 that is a biasing device provided on a radially outer side of the slide valve body 90.

A side surface on an axially right side of the flange portion. 90b faces the right in the axial direction where the main valve 50 is formed, and is a receiving surface 90c that is tilted with respect to a reciprocating direction of the main and auxiliary valve body 51 and of the slide valve body 90. Incidentally, the tilt of the receiving surface 90c having a linear shape in a side view has been described as an example, but is not limited to the example and may have, for example, a curved shape in a side view.

In addition, an inner side of the slide valve body 90, namely, an inner peripheral surface of the base portion 90a is formed as a flush surface. Incidentally, the inner peripheral surface of the base portion. 90a and an outer peripheral surface of the base portion 52b of the pressure sensitive valve member 52 are slightly separated from each other in the radial direction to form a very small gap, and the slide valve body 90 is smoothly movable relative to the pressure sensitive valve member 52 in the axial direction.

In addition, an end surface portion 90d is formed at an axially right end of the slide valve body 90, namely, at an axially right end of the base portion 90a, the end surface portion 90d coming into contact with a stopper portion 51d formed on radially inner side of the axially left end of the main and auxiliary valve body 51 when the slide valve body 90 moves to the right in the axial direction to open the through-holes 52d of the pressure sensitive valve member 52 (refer to FIG. 4). In addition, an end surface portion 90e is formed at an axially left end of the slide valve body 90, namely, at an axially left end of the base portion 90a, the end surface portion 90e being capable of coming into contact with a side surface 52e on an axially right side of the flange portion 52c of the pressure sensitive valve member 52 when the slide valve body 90 moves to the left in the axial direction to close the through-holes 52d of the pressure sensitive valve member 52 (refer to FIGS. 2 and 3). Accordingly, an axial position of the slide valve body 90 when the through-holes 52d of the pressure sensitive valve member 52 are opened and closed by the axially left end portion of the base portion. 90a of the slide valve body 90 is determined.

Incidentally, the through-holes 52d of the pressure sensitive valve member 52 are formed on an axially right side of the side surface 52e on the axially right side of the flange portion 52c, and until the end surface portion 90e formed at the axially left end of the base portion 90a of the slide valve body 90 moves to the axial position of axially left opening ends of the through-holes 52d from a state where the end surface portion 90e is in contact with the side surface 52e of the flange portion 52c of the pressure sensitive valve member 52, a state where the axially left end portion of the base portion 90a of the slide valve body 90 overlaps the through-holes 52d in the radial direction and closes the through-holes 52d is maintained.

As shown in FIGS. 2 to 4, an axially left end of the coil spring 91 is in contact with the side surface 52e on the axially right side of the flange portion 52c of the pressure sensitive valve member 52, and an axially right end of the coil spring 91 is in contact with a side surface 90f on an axially left side of the flange portion 90b of the slide valve body 90 that is externally fitted to the base portion 52b of the pressure sensitive valve member 52, and the coil spring 91 biases the slide valve body 90 to the right in the axial direction toward the stopper portion 51d of the main and auxiliary valve body 51.

Incidentally, the coil spring 91 is a compression spring, and an inner periphery of the coil spring 91 is slightly separated from an outer peripheral surface of the base portion 90a of the slide valve body 90 in the radial direction. Incidentally, the inner periphery of the coil spring 91 may be guided by the outer peripheral surface of the base portion 90a of the slide valve body 90.

Next, operation of the capacity control valve V, mainly operation of an opening and closing mechanism of the through-holes 52d of the pressure sensitive valve member 52 performed by the slide valve body 90 will be described in order of at a start-up and during normal control.

First, the operation at a start-up will be described. After the variable displacement compressor M is left without being used for a tong time, the discharge pressure Pd, the control pressure Pc, and the suction pressure Ps are substantially in equilibrium. Incidentally, although not shown for convenience of description, the fluid of high pressure in the control chamber 4 may be liquefied when the variable displacement compressor M is left in a stopped state for a long time, and at this time, due to the suction pressure Ps being high in the intermediate communication passage 55, the pressure sensitive body 60 is contracted and actuated to separate the axially right end 70a of the adapter 70 from the pressure sensitive valve seat 52a of the pressure sensitive valve member 52, so that the pressure sensitive valve 53 is opened. As described above, for example, when the suction pressure Ps is high at a start-up, the liquid refrigerant in the control chamber 4 can be discharged to the suction chamber 3 via the intermediate communication passage 55 in a short time by opening of the pressure sensitive valve 53.

In a non-energized state of the capacity control valve V, the movable iron core 84 is pressed to the right in the axial direction by a biasing force of the coil spring 85 forming the solenoid 80 or by the biasing force of the coil spring 62 and of the bellows core 61 that form the pressure sensitive body 60, to move the drive rod 83, the main and auxiliary valve body 51, and the pressure sensitive valve member 52 to the right in the axial direction, so that the step portion 51b on the axially right side of the main and auxiliary valve body 51 is seated on the auxiliary valve seat 82a of the fixed iron core 82 to close the auxiliary valve 54, and the axially left end 51a of the main and auxiliary valve body 51 separates from the main valve seat 10a formed in the inner peripheral surface of the valve housing 10, to open the main valve 50 (refer to FIG. 2). At this time, the slide valve body 90 is located at the left in the axial direction to close the through-holes 52d of the pressure sensitive valve member 52.

Due to electromagnetic force generated by the application of an electric current to the solenoid 80 when the variable displacement compressor M is started up and the capacity control valve V is energized, the movable iron core 84 is pulled to the axially left side toward the fixed iron core 82, the drive rod 83 fixed to the movable iron core 84, the main and auxiliary valve body 51, and the pressure sensitive valve member 52 move together to the left in the axial direction, and the pressure sensitive body 60 is pressed and contracted to the left in the axial direction, so that the step portion 51b on the axially right side of the main and auxiliary valve body 51 separates from the auxiliary valve seat 82a to open the auxiliary valve 54, and the axially left end 51a of the main and auxiliary valve body 51 is seated on the main valve seat 10a to close the main valve 50 (refer to FIG. 4). At this time, the slide valve body 90 is reliably moved to the right in the axial direction by the biasing force of the coil spring 91, to open the through-holes 52d of the pressure sensitive valve member 52.

As described above, when the slide valve body 90 opens the through-holes 52d of the pressure sensitive valve member 52 at a start-up, the pressure sensitive chamber 40 communicates with the intermediate communication passage 55 via the through-holes 52d and the fluid flows (shown by solid arrows in FIG. 4). Namely, since the slide valve body 90 opens the through-holes 52d of the pressure sensitive valve member 52 to form a flow passage for the discharge of the fluid in order of the control chamber 4, the Pc port 14, the pressure sensitive chamber 40, the through-holes 52d, the intermediate communication passage 55, the auxiliary valve chamber 30, the Ps port 13, and the suction chamber 3, the liquefied fluid of the control chamber 4 can be discharged in a short time to improve responsiveness at a start-up. In addition, for example, as described above, even when the pressure sensitive valve 53 is not opened by the suction pressure Ps at a start-up, the slide valve body 90 can open the through-holes 52d of the pressure sensitive valve member 52 to form the flow passage for the discharge of the fluid from the control chamber 4 to the suction chamber 3 via the intermediate communication passage 55.

Next, the operation during normal control will be described. During normal control, an opening degree or an opening time of the main valve 50 is adjusted by duty control of the capacity control valve V, to control the flow rate of the fluid from the Pd port 12 to the Pc port 14. At this time, the receiving surface 90c of the slide valve body 90 receives a flow of the fluid (shown by solid arrows in FIG. 3) from the Pd port 12 to the Pc port 14 generated by opening of the main valve 50, so that a force to move the slide valve body 90 to the left in the axial direction acts on the slide valve body (shown by white arrows FIG. 3), the slide valve body 90 moves to the left in the axial direction against the biasing force of the coil spring 91, and the through-holes 52d of the pressure sensitive valve member 52 are closed by the axially left end portion of the base portion (refer to FIG. 3).

As described above, when the slide valve body 90 closes the through-holes 52*d* of the pressure sensitive valve member 52 during normal control, since the flow passage to be formed by the control chamber 4, the Pc port 14, the pressure sensitive chamber 40, the through-holes 52*d*, the intermediate communication passage 55, the auxiliary valve chamber 30, the Ps port 13, and the suction chamber 3 is not formed, the rate of outflow of the refrigerant from the control chamber 4 to the suction chamber 3 is reduced, so that the operating efficiency of the variable displacement compressor M can improved.

In addition, when the variable displacement compressor M is driven at the maximum capacity, the capacity control valve V is energized at a maximum duty, so that the main valve 50 is closed and the slide valve body 90 is moved to the right in the axial direction to open the through-holes 52*d* of the pressure sensitive valve member 52 and to allow communication between the Pc port 14 and the Ps port 13. Therefore, the control pressure Pc can be quickly lowered. For this reason, the pistons 7 in the cylinders 4*a* of the control chamber 4 can be quickly variable, and the state of the maximum capacity can be maintained to improve the operating efficiency.

As described above, during normal control of the capacity control valve V, the through-holes 52*d* of the pressure sensitive valve member 52 are closed, and at a start-up and at the time of a maximum capacity operation, the slide valve body 90 is moved to open the through-holes 52*d* of the pressure sensitive valve member 52, so that the operating efficiency of the variable displacement compressor M can be improved.

In addition, since the coil spring 91 is disposed between the side surface 90*f* on the axially left side of the flange portion 90*b* of the slide valve body 90 and the side surface 52*e* on the axially right side of the flange portion 52*c* formed closer to a tip side than the through-holes 52*d* in the pressure sensitive valve member 52, namely, on the axially left side thereof, and the coil spring 91 and the through-holes 52*d* of the pressure sensitive valve member 52 can be disposed at a position to overlap each other in the radial direction, the axial length of each of the slide valve body 90 and the pressure sensitive valve member 52 can be shortened, and the capacity control valve V can be compactly configured.

Figure 5:
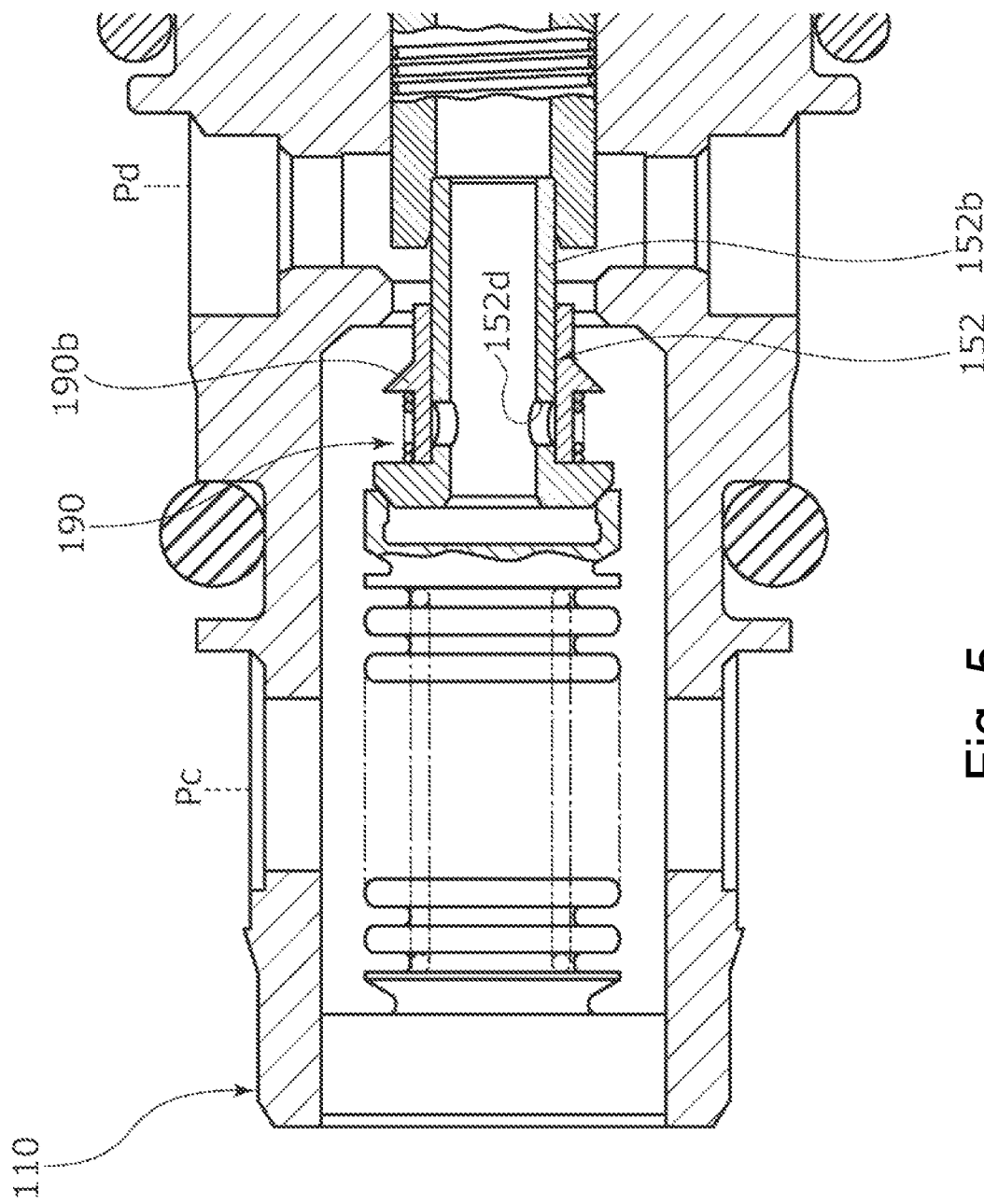
FIG. 5 is an enlarged cross-sectional view showing a modification example of the capacity control valve of the embodiment.

Specifically, for example, as in a modification example of the capacity control valve V shown in FIG. 5, since the axial length of a flange portion 190*b* of a slide valve body 190 and the axial length of a base portion 152*b* on an axially right side of through-holes 152*d* of a pressure sensitive valve member 152 can be more shortened than those of the embodiment, and the axial length of a valve housing 110 can be shortened accordingly, the capacity control valve V can be compactly configured.

In addition, since the coil spring 91 is disposed in a state of being exposed to the pressure sensitive chamber 40, and it is difficult for the coil spring 91 to be affected by the pressure of the fluid which is involved in the opening and closing of the through-holes 52*d* of the pressure sensitive valve member 52 by reciprocation of the slide valve body 90, the responsiveness of the coil spring 91 is good.

In addition, an inner peripheral surface of the slide valve body 90 is formed as a flush surface, in detail, formed in a cylindrical shape having a constant inner diameter in the axial direction, and slides on the outer peripheral surface of the base portion 52*b* of the pressure sensitive valve member 52 in a range that is long in the axial direction, so that the slidability of the slide valve body 90 on the pressure sensitive valve member 52 can be enhanced. Further, since a radial dimension of a very small gap between the inner peripheral surface of the slide valve body 90 and the outer peripheral surface of the base portion 52*b* of the pressure sensitive valve member 52 is set to be substantially constant, the amount of the fluid that slightly leaks to the intermediate communication passage 55 through the very small gap can be further reduced, so that the operating efficiency of the variable displacement compressor M can be further improved.

In addition, since the inner peripheral surface of the slide valve body 90 is formed as a flush surface to prevent the pressure of the fluid to act in the axial direction, the fluid entering the very small gap between the inner peripheral surface of the slide valve body 90 and the outer peripheral surface of the base portion 52*b* of the pressure sensitive valve member 52, even when a differential pressure is generated between the very small gap and the pressure sensitive chamber 40, the influence of the differential pressure can be suppressed and operation of the slide valve body 90 can be smoothly performed.

In addition, since an inner peripheral surface of the slide valve body 90 is slidable on the outer peripheral surface of the base portion 52*b* of the pressure sensitive valve member 52 in the axial direction, the movement of the fluid that slightly leaks to the intermediate communication passage 55 through the very small gap that is long in the axial direction can be stabilized, and particularly, it is difficult to affect an opening operation of the through-holes 52*d* performed by the slide valve body 90 using the biasing force of the coil spring 91.

In addition, since the through-holes 52*d* of the pressure sensitive valve member 52 are formed to penetrate through the base portion 52*b* having a thin radial thickness in the axial direction, the radial length of the through-holes 52*d* is shortened, so that the fluid easily flows into the intermediate communication passage 55 from the pressure sensitive chamber 40 through the through-holes 52*d*, and the responsiveness of the variable displacement compressor M can be improved.

In addition, since the receiving surface 90*c* of the slide valve body 90 faces the right in the axial direction where the main valve 50 is formed, in a non-energized state of the capacity control valve V, the receiving surface 90*c* receives a flow of the fluid from the Pd port 12 to the Pc port 14 generated by opening of the main valve 50, a force to move the slide valve body 90 to the left in the axial direction easily acts thereon, and the slide valve body 90 is easily actuated.

In addition, since the receiving surface 90*c* of the slide valve body 90 is tilted with respect to the reciprocating direction of the main and auxiliary valve body 51 and of the slide valve body 90, in a non-energized state of the capacity control valve V, a flow of the fluid from the Pd port 12 to the Pc port 14 is easily generated by opening of the main valve 50.

Further, inside the valve housing 10, since the slide valve body 90 is disposed such that an outer peripheral surface of the slide valve body 90 including an axially right end portion of the base portion 90*a* and the receiving surface 90*c* on the axially right side of the flange portion 90*b* is close to an inner peripheral surface of the annular protrusion portion. 10*c* at which the main valve seat 10*a* forming the main valve 50 is formed, a relatively narrow flow passage is formed between the main valve chamber 20 and the pressure sensitive chamber 40, so that a flow of the fluid from the Pd port 12 to the Pc port 14 is more easily generated by opening of the main valve 50.

In addition, since the coil spring 91 that biases the slide valve body 90 toward the right in the axial direction is disposed on a back surface side of the receiving surface 90c of slide valve body 90, namely, on the axially left side of the flange portion 90b, the slide valve body 90 is reciprocatable in the axial direction with a simple structure.

In addition, until the slide valve body 90 slides to the right in the axial direction by a predetermined distance or more from a state where the end surface portion. 90e on the axially left side is in contact with the side surface 52e of the flange portion 52c of the pressure sensitive valve member 52, since the slide valve body 90 can maintain a state where the through-holes 52d of the pressure sensitive valve member 52 are closed by the axially left end portion of the base portion. 90a, even when the slide valve body 90 slightly slides due to disturbance such as vibration, the closed state of the through-holes 52d of the pressure sensitive valve member 52 is maintained. For this reason, the capacity control valve V is resistant to disturbance, and has good control accuracy.

In addition, since the main and auxiliary valve body 51 and the pressure sensitive valve member 52 are separate bodies, and the stopper portion 51d that restricts a movement of the slide valve body 90 to the axially right side is formed in the main and auxiliary valve body 51, the axial movement of the slide valve body 90 can be restricted with a simple structure.

In addition, since the plurality of through-holes 52d of the pressure sensitive valve member 52 are formed, a wide cross-sectional area of the flow passage for the discharge of the fluid from the Pc port 14 to the suction chamber 3 can be secured. In addition, since the plurality of through-holes 52d are evenly disposed in a circumferential direction, the stroke of the slide valve body 90 can be shortened.

The embodiment of the present invention has been described above with reference to the drawings; however, the specific configurations are not limited to the embodiment, and changes or additions that are made without departing from the scope of the present invention are also included in the present invention.

For example, in the embodiment, the slide valve body has been described as reciprocating relative to the pressure sensitive valve member in the axial direction; however, the present invention is not limited to the configuration and, for example, the slide valve body may reciprocate relative to the pressure sensitive valve member in the axial direction while rotating and sliding with respect to the pressure sensitive valve member.

In addition, in the embodiment, an example has been described in which the main and auxiliary valve body and the pressure sensitive valve member are formed as separate bodies, but both may be integrally formed.

In addition, the receiving surface of the slide valve body may be formed to be orthogonal to the reciprocating direction of the main and auxiliary valve body and of the slide valve body.

In addition, the inner peripheral surface of the slide valve body may not be formed as a flush surface.

In addition, the reciprocation of the slide valve body may guided by the adapter 70.

In addition, in the slide valve body, the base portion and the flange portion may be separately formed.

In addition, in the pressure sensitive valve member, the base portion and the flange portion that is a support portion may be separately formed.

In addition, the communication passage that provides direct communication between the control chamber 4 and the suction chamber 3 of the variable displacement compressor M, and the fixed orifice may not be provided.

In addition, the auxiliary valve 54 may not be provided, and it is sufficient that the step portion 51b on the axially right side of the main and auxiliary valve body 51 functions as a support member that receives an axial load, and the step portion 51h does not necessarily require a sealing function.

In addition, the pressure sensitive chamber 40 may be provided on an axially right side of the main valve chamber 20 in which the solenoid 80 is provided, and the auxiliary valve chamber 30 may be provided on an axially left side of the main valve chamber 20.

In addition, the coil spring 91 is not limited to a compression spring, and may be a tensile spring or may be a spring having a shape other than a coil shape.

In addition, the coil spring 91 may not face the pressure sensitive chamber 40.

In addition, the pressure sensitive body 60 may not use a coil spring inside.

In addition, by means of duty control of the capacity control valve V, an opening degree or an opening time of the main valve 50 may be adjusted to control the flow rate of the fluid from the Pd port 12 to the Pc port 14 and to adjust a movement amount of the slide valve body 90 to the left in the axial direction, and opening degree adjustment of the through-holes 52d of the pressure sensitive valve member 52 may be performed by the axially left end portion of the base portion 90a of the slide valve body 90. Accordingly, the flow rate of the fluid flowing from the Pc port 14 to the Ps port 13 can be adjusted.

REFERENCE SIGNS LIST

1 Casing
2 Discharge chamber
3 Suction chamber
4 Control chamber
10 Valve housing
10a Main valve seat
10c Annular protrusion portion
11 Partition adjustment member
12 Pd port (discharge port)
13 Ps port (suction port)
14 Pc port (control port)
20 Main valve chamber
30 Auxiliary valve chamber
40 Pressure sensitive chamber
50 Main valve
51 Main and auxiliary valve body (valve body)
51c Through-hole
51d Stopper portion
52 Pressure sensitive valve member
52a Pressure sensitive valve seat
52b Base portion
52c Flange portion (support portion)
52d Through-hole
52e Side surface
60 Pressure sensitive valve
54 Auxiliary valve
55 intermediate communication passage
60 Pressure sensitive body
70 Adapter
70a Axially right end
80 Solenoid
90 Slide valve body
90a Base portion
90b Flange portion 90c Receiving surface
90d End surface portion
90e End surface portion
90f Side surface
91 Coil spring (biasing device)
110 Valve housing
152 Pressure sensitive valve member
152b Base portion
152d Through-hole
190 Slide valve body
190b Flange portion
M Variable displacement compressor
V Capacity control valve

The invention claimed is:

1. A capacity control valve comprising:
a valve housing provided with a discharge port through which a discharge fluid of a discharge pressure passes, a suction port through which a suction fluid of a suction pressure passes, and a control port through which a control fluid of a control pressure passes;
a main valve including a valve body driven by a solenoid, and a main valve seat which is provided between the discharge port and the control port and with which the valve body is contactable;
a pressure sensitive body disposed in a pressure sensitive chamber; and
a pressure sensitive valve member extending from the valve body to the pressure sensitive chamber and forming a pressure sensitive valve, together with the pressure sensitive body,
wherein an intermediate communication passage is formed in the valve body and in the pressure sensitive valve member,
the control port and the suction port are allowed to communicate with each other through the intermediate communication passage by opening the pressure sensitive valve,
the pressure sensitive valve member is provided with a through-hole communicating with the intermediate communication passage and has a slide valve body attached thereto such that the slide valve body slides relative to the pressure sensitive valve member to open and close the through-hole, and
a biasing device that biases the slide valve body in an opening direction is provided on a radially outer side of the slide valve body.

2. The capacity control valve according to claim 1, wherein the biasing device is disposed between the slide valve body and a support portion formed closer to a tip side than the through-hole in the pressure sensitive valve member.

3. The capacity control valve according to claim 1, wherein the biasing device is disposed so as to be exposed to the pressure sensitive chamber.

4. The capacity control valve according to claim 1, wherein an inner peripheral surface of the slide valve body is formed as a flush surface.

5. The capacity control valve according to claim 1, wherein a receiving surface facing toward the main valve is formed in the slide valve body.

6. The capacity control valve according to claim 5, wherein the receiving surface is tilted with respect to a reciprocating direction of the valve body.

7. The capacity control valve according to claim 1, wherein the slide valve body is disposed to be strokable in a closed state of the through-hole.

8. The capacity control valve according to claim 1, wherein the valve body and the pressure sensitive valve member are separate bodies, and a stopper portion that restricts a movement of the slide valve body toward the main valve is formed in the valve body.

9. The capacity control valve according to claim 1, wherein a plurality of the through-holes are formed in the pressure sensitive valve member.

10. The capacity control valve according to claim 2, wherein the biasing device is disposed so as to be exposed to the pressure sensitive chamber.

11. The capacity control valve according to claim 2, wherein an inner peripheral surface of the slide valve body is formed as a flush surface.

12. The capacity control valve according to claim 2, wherein a receiving surface facing toward the main valve is formed in the slide valve body.

13. The capacity control valve according to claim 12, wherein the receiving surface is tilted with respect to a reciprocating direction of the valve body.

14. The capacity control valve according to claim 2, wherein the slide valve body is disposed to be strokable in a closed state of the through-hole.

15. The capacity control valve according to claim 2, wherein the valve body and the pressure sensitive valve member are separate bodies, and a stopper portion that restricts a movement of the slide valve body toward the main valve is formed in the valve body.

16. The capacity control valve according to claim 2, wherein a plurality of the through-holes are formed in the pressure sensitive valve member.

17. The capacity control valve according to claim 3, wherein an inner peripheral surface of the slide valve body is formed as a flush surface.

18. The capacity control valve according to claim 3, wherein a receiving surface facing toward the main valve is formed in the slide valve body.

19. The capacity control valve according to claim 18, wherein the receiving surface is tilted with respect to a reciprocating direction of the valve body.

20. The capacity control valve according to claim 3, wherein the slide valve body is disposed to be strokable in a closed state of the through-hole.

* * * * *